June 18, 1968  A. C. HILL  3,388,606
WEDGE TYPE ACTUATORS FOR VEHICLE BRAKES
Filed June 8, 1966   6 Sheets-Sheet 1
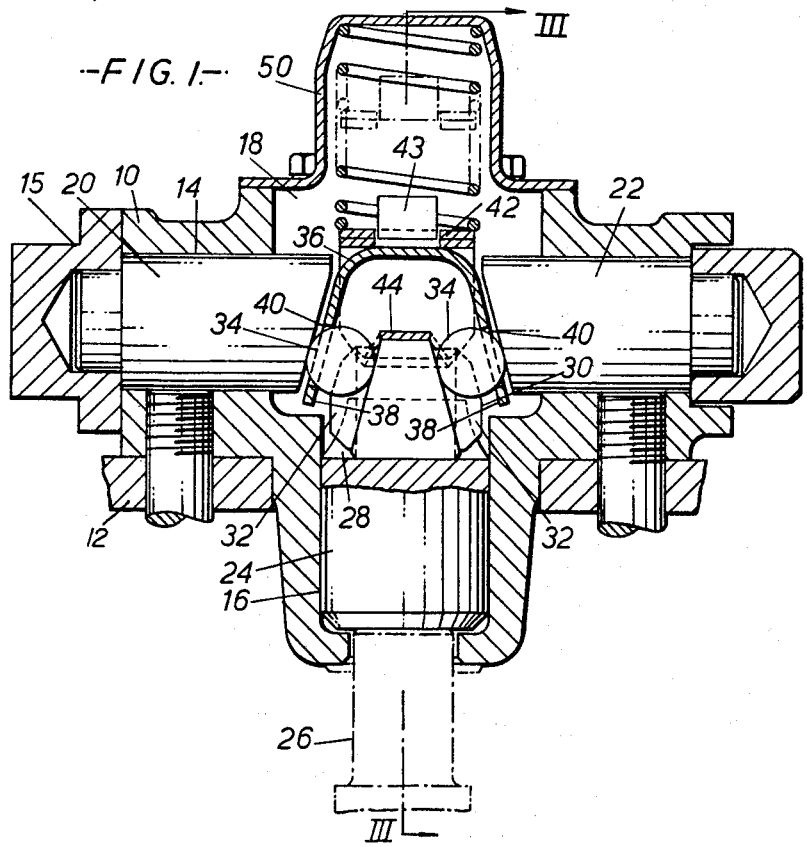
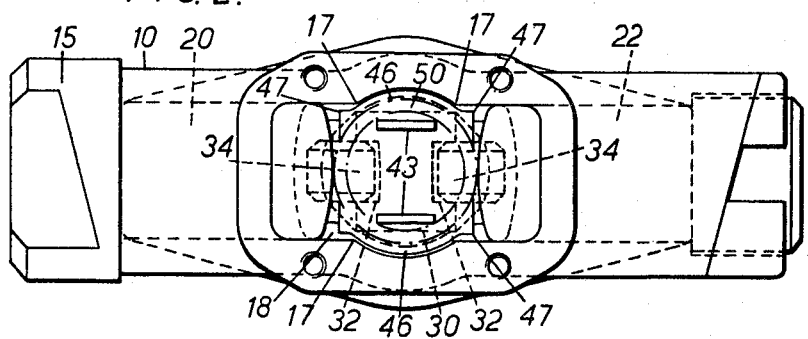

June 18, 1968  A. C. HILL  3,388,606
WEDGE TYPE ACTUATORS FOR VEHICLE BRAKES
Filed June 8, 1966  6 Sheets-Sheet 2
-FIG. 3.-
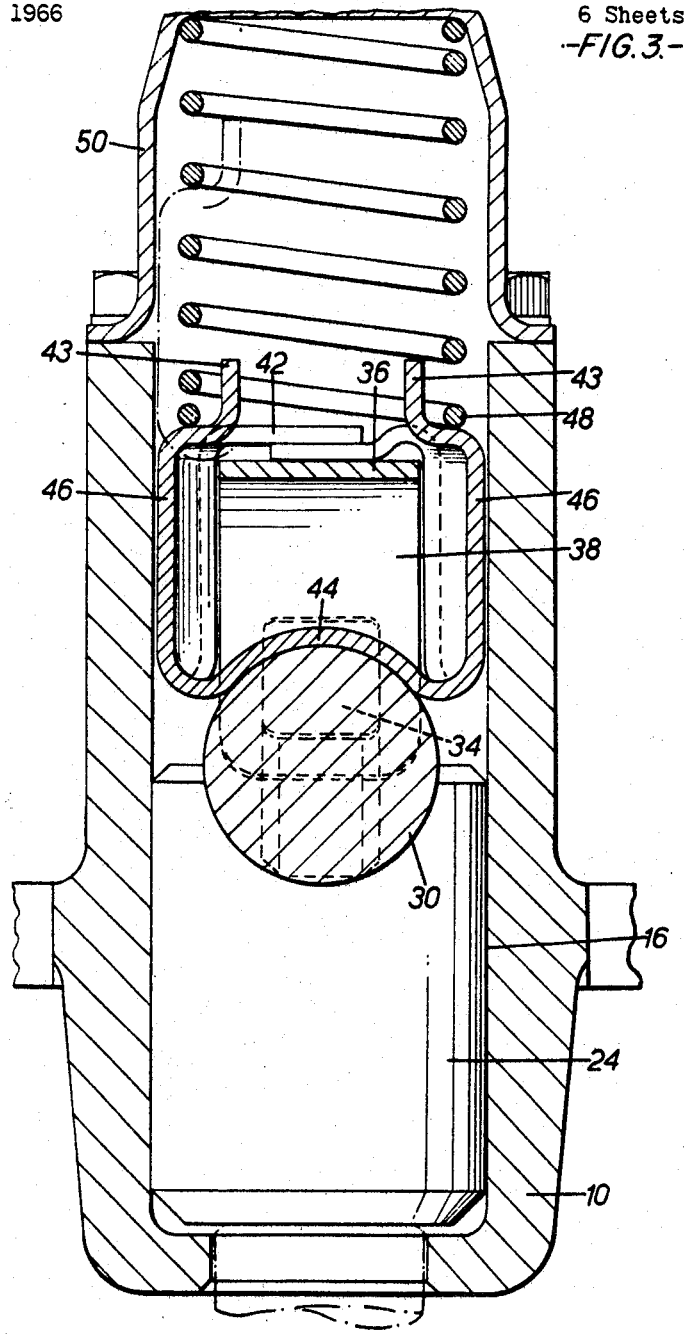

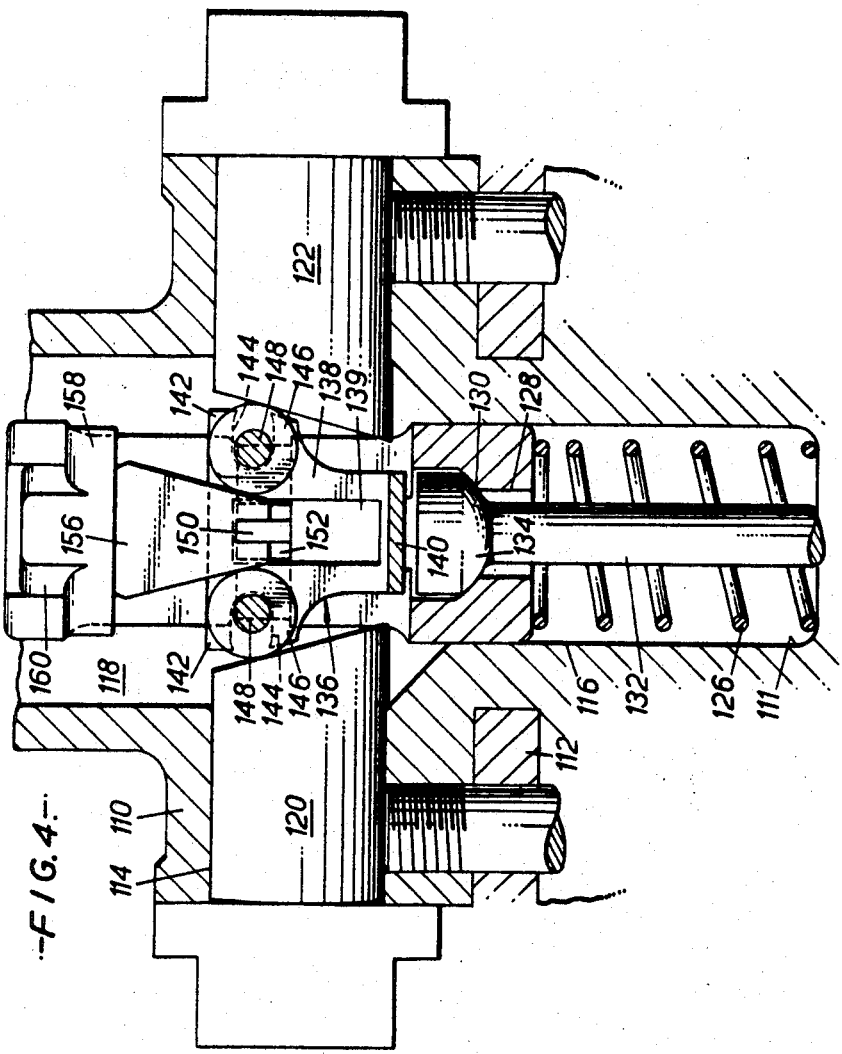

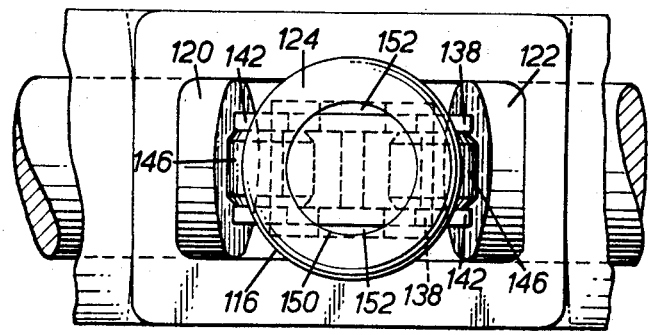
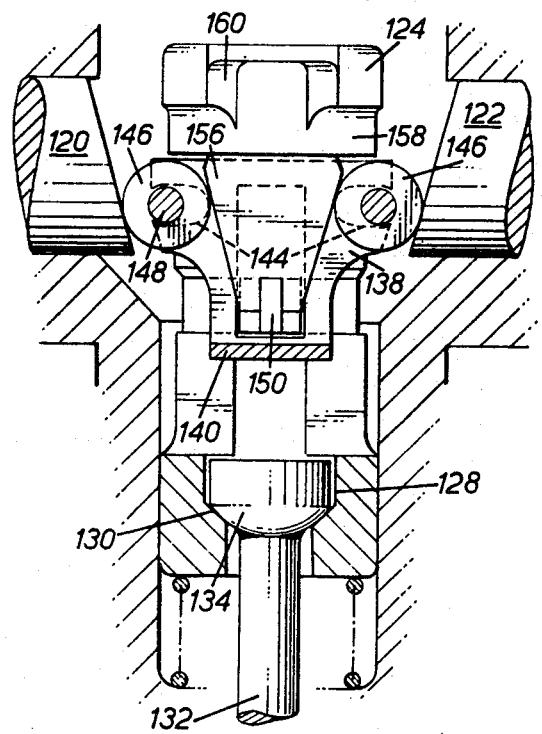

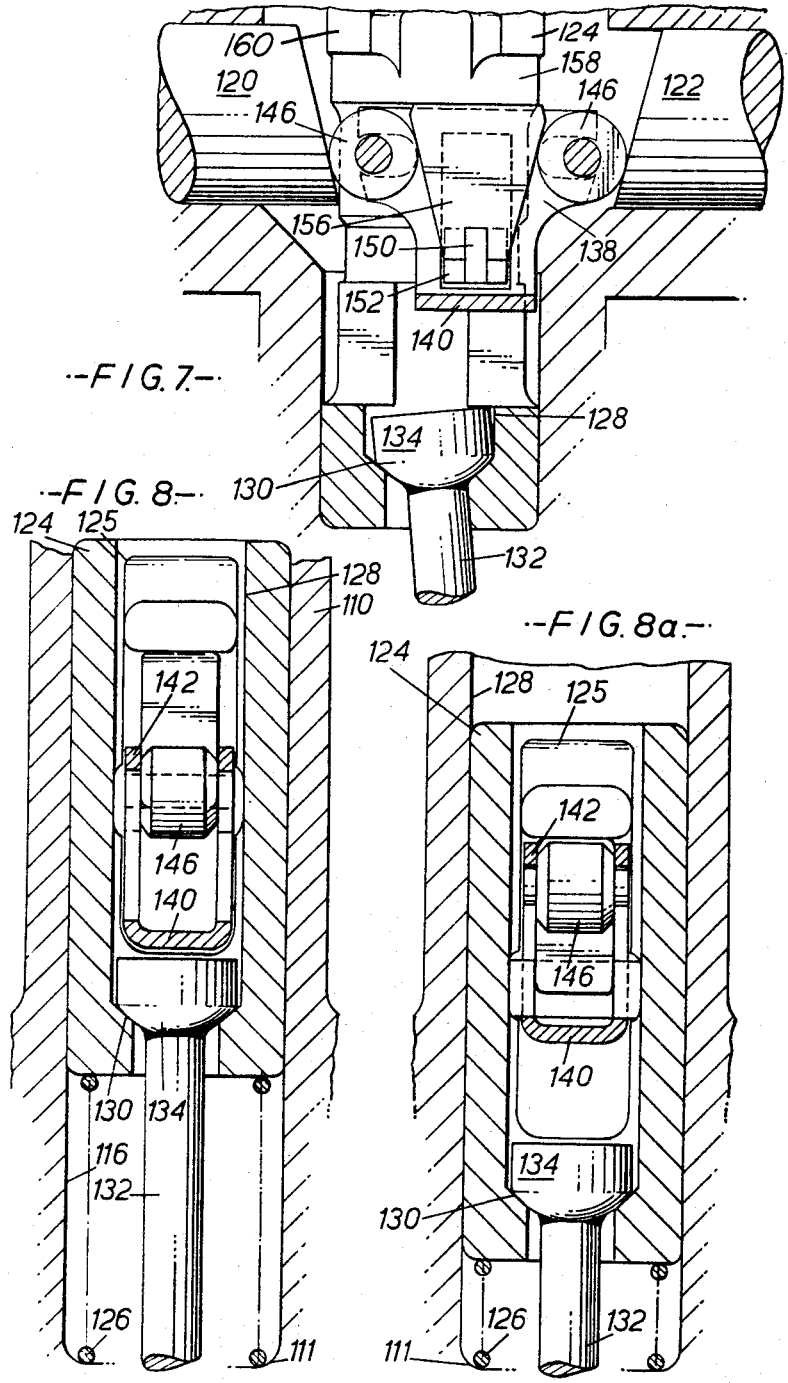

3,388,606
WEDGE TYPE ACTUATORS FOR
VEHICLE BRAKES
Albert Charles Hill, Birmingham, England, assignor to
Girling Limited, Birmingham, England
Filed June 8, 1966, Ser. No. 556,179
Claims priority, application Great Britain, June 9, 1965,
24,334/65; July 8, 1965, 28,911/65
10 Claims. (Cl. 74—110)

ABSTRACT OF THE DISCLOSURE

The invention provides a wedge type expander assembly for vehicle brakes. The wedge member in the expander assembly acts on a pair of laterally opposed tappets through two rolling elements interposed between the wedge and the tappet ends. A cage is provided to retain the rolling elements in correct alignment with the wedge and tappets and the cage is prevented from any movement except in line with and perpendicular to the direction of movement of the tappets.

---

This invention concerns wedge type expander or actuator assemblies for vehicle brakes and relates more particularly to such assemblies of the type in which one or both of a pair of laterally opposed tappets or similar thrust members is or are displaced responsive to movement of a wedge member situated between them rolling elements such as rollers being interposed between the tappets and the wedge member to reduce the frictional losses involved in their relative movement.

Although many actuator assemblies of the type described are in use, difficulty is often experienced in maintaining pure rolling motion between each tappet, its cooperating roller and the wedge member and a common cause of this difficulty is believed to be that the rollers do not remain in phase with one another as they move along the wedge and tappet surfaces. Thus, in arrangements where the wedge member is deliberately permitted some degree of lateral float in order to accommodate uneven wear of the frictional elements of the brake, although it is usually regarded as preferable to keep the floating movement of the wedge member at a minimum, this condition is seldom realised where differential roller displacement occurs. Moreover, where, as is most usual, the tappets are arranged in bores in an actuator housing, the inner ends of the bores can become damaged as a result of the roller displacement with the consequence that a tappet may thereafter become prevented from returning to its proper rest position. The further result then occurs, that the roller associated with that tappet takes up a permanently out of phase position and in this way an accumulation or acceleration of further damage is produced. Eventually, the lateral floating movement of the wedge member within a plunger or other component by which it is displaced then becomes excessive, damage to both of them occurs and the plunger travel is reduced. If the wedge member is carried in a bore of the plunger, circumstances can then arise in which the roller penetrates wholly or partly into the plunger bore and then assumes a tilted position relative to its associated tappet, so that pure rolling motion between the roller and the wedge and tappet surfaces thereafter becomes impossible.

It will be evident from the foregoing that the cage must be capable of movement relative to the wedge in the direction of actuator movement but there must be no relative movement between them in a direction transverse to the direction of actuator movement. That is, the cage must not be capable of tilting or pivoting.

According to one aspect of the present invention, a wedge type actuator for vehicle brakes comprises a pair of laterally opposed thrust members having oppositely inclined inner end faces, of which at least one thrust member is displaceable in response to movement of a wedge member carried by and slidable transversely relative to a plunger, said wedge member being situated between the two thrust members and having correspondingly inclined faces rolling elements being interposed between the cooperating inclined faces of the thrust members and the wedge member to reduce frictional losses due to their relative motion and a cage is provided for holding the rolling elements and retaining them in proper alignment with said cooperating inclined faces.

A preferred embodiment of actuator according to the present invention comprises a housing formed with a pair of perpendicular intersecting bores, a pair of thrust members such as tappets in one of said bores arranged one on each side of the intersection therein, said tappets having oppositely inclined inner end faces, a plunger in the other bore and situated at one side of said intersection, the inner end face of said plunger being grooved in a direction parallel to the axis of the first bore, a wedge member seated in said groove and having a pair of inclined faces respectively parallel to and spaced from the inclined end faces of the tappets, a roller between each pair of parallel wedge and tappet faces, and a cage engaging said rollers to retain the same in a predetermined attitude relative to said wedge and tappet faces and to resiliently bias said rollers against the respectively cooperating wedge faces.

Since the rollers are retained in the cage, they cannot become out of phase with one another and neither can they tilt relative to the inclined faces upon which they roll. Moreover, by enlarging the said other bore at the intersection and making the tappets of such a length that their inner ends project from their respective bores into the enlarged intersection, the rollers are isolated from the tappet bores and, because they are retained by the cage are rendered incapable of damaging the inner ends of said bores.

The cage itself is preferably of simple inverted U formation having a roller retaining slot towards the free end of each of its limbs, and in order to maintain the cage in alignment with the tappet bores, it is conveniently held in an open-sided box having its base seated on the wedge member and its top constituting an abutment for a spring, the other end of which bears against a cover closing the end of said other bore remote from the plunger.

The groove in the inner end of the plunger is preferably of semi-cylindrical shape, the wedge member having a cylindrical configuration with inclined wedge surfaces machined into its axial end faces and the base of the cage retaining box is then cylindrically recessed to seat snugly on the wedge member at a position opposite the plunger groove.

According to another aspect of the present invention in a wedge type actuator comprising a housing formed with a pair of axially aligned, opposed bores each having a thrust member arranged therein, a plunger movable in a direction intermediate and transverse to the thrust members and a wedge member actuated by the plunger to displace the thrust members in their respective bores, a roller being arranged between the wedge member and the cooperating end surface of each tappet, the rollers are held and guided by a cage which in turn is constrained by the plunger in a desired orientation relative to the tappets, whereby the cage maintains the rollers in proper alignment with their cooperating inclined faces, with the plane joining the roller axes substantially parallel to the axis of said pair of bores. Preferably the plunger is internally hollow to receive the cage and cooperating key and slot or equivalent means are provided between the two to prevent their relative rotation. Conveniently, the cage may additionally provide a seating for the wedge member and in turn restrain the latter from rotation.

The invention will be described further, by way of example, with reference to the accompanying drawings, in which:

FIG. 1 is an axial section through a wedge type actuator embodying the invention;

FIG. 2 is a plan view thereof, with parts omitted for clarity,

FIG. 3 is a section taken on the line III—III of FIG. 1,

Figure 9:
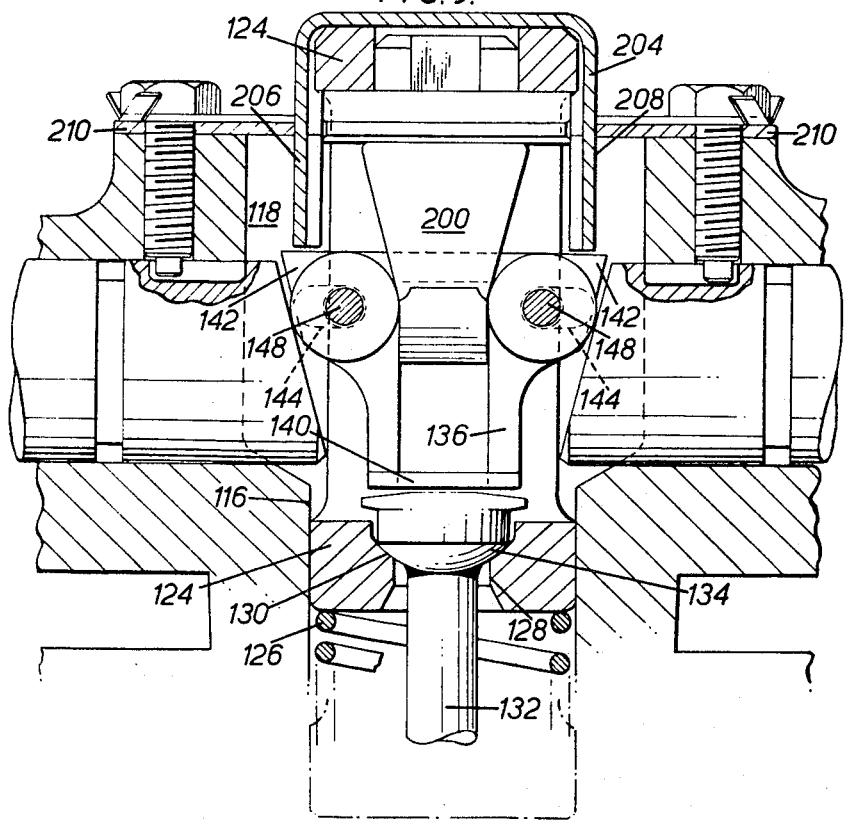
Figure 10:
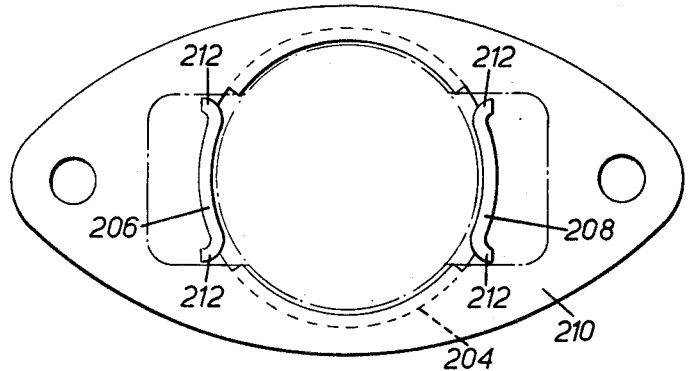

FIG. 4 is an axial section through a wedge type actuator constructed as another embodiment of the invention, FIG. 5 is a front elevation thereof with parts omitted for clarity, FIG. 6 is a diagrammatic illustration, generally in section similar to that of FIG. 4 showing the actuator in the position which it assumes when the brakes are applied, FIG. 7 is a diagrammatic illustration generally similar to that of FIG. 6 showing another operational condition of the actuator, FIGS. 8 and 8a are diagrammatic illustrations taken in section on planes perpendicular to those of FIGS. 4 and 6 and showing the actuator parts in the positions respectively corresponding to those two figures, FIG. 9 is an axial section similar to FIG. 4, through a wedge type actuator constructed as a further alternative embodiment of the invention, and FIG. 10 is a view, from below, of an end cap for the actuator of FIG. 9, In the actuator shown in FIGS. 1 to 3 of the drawings, a housing 10 adapted for securing to a backplate 12 is formed with a first bore 14 and with a second, perpendicularly directed bore 16 which intersects the bore 14 and at the intersection is enlarged to create a central chamber 18. At the outer ends of the bore 14 are arranged spaced tappets 20 and 22 having their inner ends projecting into the chamber 18. A plunger 24 is slidably located at one end of the bore 16 and is axially displaceable in the bore 16 by a push rod diagrammatically indicated at 26 which is engageable with the outer end of the plunger and which itself is mechanically or hydraulically operated in conventional manner. The inner end of the plunger 24 is provided with a groove 28 of semi-cylindrical cross-section lying axially parallel to the bore 14 and within the groove 28 there is seated a cylindrical wedge member 30 having chamfered ends into which are machined rectangular section grooves 32. The bases of the grooves 32 taper inwardly in wedge-like manner in a direction away from the plunger 24 and the end faces of the tappets 20 and 22 are similarly inclined so that each one lies in spaced parallel relation with one of the groove bases. Between each tappet inclined end face and the cooperating base of a groove 32 is positioned a roller 34, and thus, when the plunger 24 is axially displaced in the bore 16 by the push rod 26, that movement is transmitted by the rollers 34 to the tappets 20 and 22, of which the tappet 20 is maintained fixed in the bore 14 by an end closure cap 15, so that the tappet 22 is urged outwardly of the bore 14 both as a result of the distance which its cooperating roller 34 travels along the wedge member groove 32 and of the displacement of the wedge member 30 itself along the plunger groove 28 by the roller 34 cooperating with the tappet 20.

For the purpose of maintaining the roller axes perpendicular to the plane containing the axes of both the bores 14 and 16, and thus preserving true rolling motion of the rollers relative to the inclined surfaces with which they cooperate, a cage 36 of generally inverted U-shaped configuration and having slightly outwardly divergent limbs 38 is arranged in the chamber 18 intermediate the facing ends of the tappets 20 and 22. Each of the cage limbs 38 is provided towards its free end with a transverse slot 40 in which a roller 34 is received, and the cage is made of a springy material such as a resilient sheet steel, the limbs 38 being pre-loaded to keep the rollers resiliently urged against the bases of their respective grooves 32 in the wedge member. The cage 36 itself is maintained in alignment with the tappets 20 and 22, that is to say, with its limbs 38 substantially parallel with their respectively cooperating tappet end faces, by a cage locating box 42 within which the cage is positioned and which is an open-ended structure formed of folded sheet metal and having a cylindrically recessed base 44 seating on the wedge member 30 at a region thereof diametrically opposed to the grooved end of the plunger 24. The cage limbs 38 pass through the open ends of the cage locating box, while the sides of the box are cylindrically expanded at 46 to fit the housing bore 16. The cage locating box is maintained seated against the wedge member 30 by a spring 48 which has one end abutting on the box and its other end bearing against an end cover 50 closing the end of the bore 16 remote from that at which the plunger is introduced. The spring 48 also serves as a return spring for restoring the plunger 24 to its normal rest position in the bore 16 after it has made an actuating movement therein, the tappets being returned under the action of the usual brake shoe return springs (not shown). Lugs 43 are bent outwardly from the top of the cage locating box to maintain the spring 48 properly positioned thereon.

It will be noted that the enlargement of the bore 16 which creates the chamber 18 is made in the direction of the bore 14, only, so that angular junctions 17 are present between the bore 16 and its enlargement; and further, that while the major portions of the sides of the cage locating box are formed with the cylindrical expansions 46, the box retains true corners 47. Thus, the box corners 47 cooperate with the angular junctions 17 of the bore 16 to prevent the box from rotating to any significant extent about the axis of the bore 16, while the cylindrically expanded sides 46 prevent movement of the box axially of the bore 14. The box 42 is able to move, therefore, only axially of the bore 16, and at the same time, the cage itself can move in the box 42 only in the direction of the axis of the bore 14 but not transversely thereto. Laterally directed tabs (not shown) may be bent out from the cage base or crown portion to prevent the cage from tilting about its crown within the box and for keying the cage to the box so as to avoid cage movement relative to the box about the main axis of the latter.

The invention thus provides a wedge type actuator in which the rollers 34 are incapable of entering and damaging the tappet bores, and are at all times maintained in alignment with their respectively cooperating inclined surfaces on the wedge member and the tappets for the purpose of ensuring true rolling motion, while at the same time they are held properly in phase with one another as the plunger and wedge member are displaced. Moreover, since the cage 36 keeps the rollers running squarely in the wedge member grooves 32 and biased against the bases of those grooves, there is no possibility of a roller accidentally becoming dislodged into and damaging the plunger groove 28, so that the floating action of the wedge member is preserved and no interference is caused to the plunger travel.

In the actuator shown in FIGS. 4 to 8 of the drawings, a housing 110 is adapted for securing to a backplate 112 is formed with a first bore 114 and with a second, perpendicularly directed bore 116 which intersects the bore 114 and at the intersection is enlarged to create a central chamber 118. At the outer ends of the bore 114 are arranged spaced tappets 120 and 122 having their inner ends projecting into the chamber 118. A plunger 124 is slidably located at one end in the bore 116, the other end of the plunger extending through the intersection and into the chamber 118, and a plunger return spring 126 located between the plunger and a fixed abutment 111 of the housing 110 normally biases the plunger in the direction of the chamber 118. The plunger 124 will be seen to be of cylindrical shape and is internally provided with a stepped bore 128 which, towards the rear end of the plunger includes a conical shoulder 130 providing a seating for the part-spherical head 134 of a pull rod 132 lying axially along the bore 116. The pull rod 132 is movable axially of the bore 116 by any convenient conventional means (not shown) thereby to displace the plunger along the bore 116, and by virtue of the seating 130 and the part-spherical head 134, the pull rod 132 is enabled freely to articulate.

Within the plunger 124 is received a roller cage 136 of pressed sheet metal and having a generally U-shaped configuration with flat sides 138 and a base 140. At their upper edge regions, the cage sides 138 terminate in outwardly directed co-planar arms 142 which are slotted at 144 to receive and retain spindle ends 148 of rollers 146. Diametrically opposed regions of the plunger are formed with broached rectangular holes 125 through which the cage arms 142 project, and which serve to hold the cage lying generally axially along the bore 114. Each side 138 of the cage 136 is additionally provided with a rectangular slotted hole 139 and an I shaped key piece member 150 bridges the sides 138, passes through the holes 139 and is retained in the cage by enlarged ends 152. By virtue of this arrangement the key piece 150 is slidable in the cage 136 and within the confines of the cage engages the slotted narrower end of a tapered wedge member 156, the oppositely inclined faces of which bear against the rollers 146. The wide end of the wedge member 156 abuts the inner end face of a plug 158, the outer end face of which is of reduced diameter to constitute a spigot 160 which fits within the upper end of the plunger bore 128.

It will be appreciated that, since the wedge member is carried by the cage 136 and the latter is itself capable of moving transversely across the plunger bore 128, the wedge member is floatingly mounted with respect to the plunger, and at the same time is capable of executing movements in a direction perpendicular to the axis of the bore 114 due to its sliding seating on the key piece 150. During all such movements, however, the wedge member is prevented from rocking due to its abutment against the flat face of the plug 158. Thus, in the normal operation of the actuator, with both tappets 120 and 122 able to move freely as indicated in FIGS. 6 and 8, displacement of the pull rod along the bore 116 will result in equal amounts of transverse displacement of the two tappets along the bore 114, the cage, wedge member and roller assembly remaining positioned generally axially of the chamber 118 and bore 116. However, if one of the tappets should become seized or be deliberately rendered fixed, then operation of the pull rod 132 will cause the cage and wedge member to float transversely across the chamber 118 as shown in FIG. 7. FIG. 7 also illustrates the ability of the pull rod 132 to articulate relatively to the plunger 124 if, due to movement of the vehicle, or from other causes, it should become out of line with the axis of the bore 116.

Thus, by guiding the rollers 146 in the cage 136 and by imparting a full floating action to the wedge member 156 whilst at the same time preventing it from rocking or turning relative to the tappets and the plunger, the invention ensures that the rollers are always accurately maintained in proper alignment with the inclined surfaces of the tappets and of the wedge member, with their axes always lying in a plane which is substantially parallel to the axis of the bore 114.

A further alternative embodiment is illustrated in FIGS. 9 and 10 of the drawings, in which the wedge member 156 and key piece 150 are joined permanently to form a single component indicated at 200 in FIG. 9. The remainder of this embodiment corresponds closely to that illustrated in FIGS. 4 to 8, with the exception that the chamber 118 is closed by means of an end cap comprising a cylindrical member 204 which is closed at one end and is extended in an axial direction at the other, over two diametrically opposite arcuate regions of the cylindrical wall to form two feet 206, 208 together with a flat elliptical plate 210, adapted for fitting to the housing 110 and having a central circular aperture the diameter of which is substantially commensurate with the external diameter of the cylinder 204, over two diametrically opposite arcuate regions corresponding substantially in arcuate length to the feet 206, 208 while over the remainder, is substantially commensurate with the internal diameter of the cylinder 204. In addition the feet 206, 208 are cut-away in the region where they merge with the cylinder 204, to form slots of axial width commensurate with the thickness of the plate 210, whereby the two feet may be passed through the aperture in the plate 210 until the open end of the cylinder abuts the portions of the aperture of reduced diameter, when the edges of the feet may be bent in a radially outward direction to form securing lugs 212.

The plunger 124 is preferably a close slipping fit within the cylinder 204 which thereby serves as a guide for the free end of the plunger. In addition the axial length of the feet 206, 208 is conveniently chosen so that the end faces of the feet constitute stops for the cage 136.

I claim:

1. A wedge type actuator for vehicle brakes comprising, in combination,
    a housing,
    a pair of laterally opposed thrust members having oppositely inclined inner end faces, disposed in the housing,
    a wedge member having correspondingly inclined faces situated between the two inclined end faces of said thrust members, at least one of the thrust members being displaceable in response to movement of the wedge member,
    rolling elements interposed between the cooperating inclined faces of said wedge member and said thrust members to reduce frictional losses due to their relative motion,
    a plunger displaceable in said housing and arranged to act on said wedge member, said plunger being adapted to at least in part receive said wedge member and to permit movement thereof relative to the plunger in a transverse direction,
    means for displacing the plunger to effect movement of the wedge member, and
    a cage for holding the rolling elements and retaining them in proper alignment with said cooperating inclined faces.

2. A wedge type actuator as set forth in claim 1 wherein the wedge member is generally cylindrical and grooves of rectangular section are formed in its end faces, the bases of the grooves tapering inwardly in a wedge-like manner to constitute said corresponding inclined faces and said rolling elements being arranged within the grooves and which further comprises a cage locating box formed from folded springy sheet material as an open-ended structure, with a cylindrically recessed base for seating on the wedge member and arranged to at least in part surround the cage and to maintain it in alignment with the thrust members.

3. A wedge type actuator as set forth in claim 2 wherein the housing is formed with a pair of perpendicular intersecting bores, the intersection defining a chamber in the housing within which said wedge member is disposed, said pair of thrust members being arranged in one of the bores one on either side of the chamber while the plunger and cage locating box are arranged on opposite sides of the wedge member, spring means being disposed in said other bore and arranged to urge said cage locating box resiliently into abutting engagement with said wedge member.

4. A wedge type actuator as set forth in claim 3 wherein the cage is of generally inverted U configuration having slightly outwardly divergent limbs and each limb is formed with a roller retaining slot towards the free end thereof.

5. A wedge type actuator as set forth in claim 1 wherein the housing is formed with a pair of axially aligned opposed bores, each having a thrust member arranged therein and the plunger is movable in the housing, in a direction intermediate and transverse to the thrust members, said plunger being arranged to act on said wedge member to displace the thrust members in their respective bores and being internally hollow to receive the cage and constrain it in a desired orientation relative to the thrust members to maintain the rollers in proper alignment with the cooperating inclined faces whereby the plane joining the roller axes is substantially parallel to the axis of said pair of bores and the cage is keyed to the wedge member to prevent their relative rotation.

6. A wedge type actuator as set forth in claim 5 wherein two parallel-sided abutments are formed, one on each side of the wedge member and two parallel sided slots are formed in the sides of the cage, said abutments being guided in said slots and constituting key and slot means for said wedge member.

7. A wedge type actuator as set forth in claim 5 further comprising an I-shaped member, the lower end of the wedge member being formed with a slot to receive the central section of the I-member and two parallel sided slots being formed one in each side of the cage to receive and guide the end regions of the I-member, the I-member constituting a key between the cage and wedge member.

8. A wedge type actuator as set forth in claim 5 which further comprises a hollow end closure member formed with an internally cylindrical blind bore which is axially aligned with the plunger and constitutes a guide therefor.

9. A wedge type actuator as set forth in claim 8 wherein the end closure member is extended axially over two diametrically opposite arcuate regions of its inner open end to form two feet which constitute an end stop for the cage.

10. A wedge type actuator as set forth in claim 5 wherein the cage additionally provides a seating for the wedge thereby restraining the wedge from rotation.

References Cited

UNITED STATES PATENTS 3,113,466   12/1963   Osborne _____ 74—110

FRED C. MATTERN, Jr., *Primary Examiner.*

F. D. SHOEMAKER, *Assistant Examiner.*